United States Patent
Ubaldi (10) Patent No.: US 6,712,200 B2
(45) Date of Patent: Mar. 30, 2004

(54) AUTOMATIC CENTERING DEVICE FOR A CONVEYOR BELT FOR INDUSTRIAL AND/OR AGRICULTURAL MACHINERY

(75) Inventor: Raffaele Ubaldi, Santa Giustina di Rimini (IT)

(73) Assignee: R.O.C. Dei Fratelli Ubaldi & C.S.n.c., Santa Giustina di Rimini (IT)

( * ) Notice: Subject to any disclaimer, the term of this patent is extended or adjusted under 35 U.S.C. 154(b) by 36 days.

(21) Appl. No.: 10/228,896

(22) Filed: Aug. 27, 2002

(65) Prior Publication Data

US 2003/0045966 A1 Mar. 6, 2003

(30) Foreign Application Priority Data

Aug. 30, 2001 (IT) .................................... RN2001A0046

(51) Int. Cl.[7] ............................................... B65G 43/00
(52) U.S. Cl. .............................. 198/810.03; 198/810.01
(58) Field of Search ................................ 198/806, 807, 198/810.01, 810.03; 200/230

(56) References Cited

U.S. PATENT DOCUMENTS

| | | | | |
|---|---|---|---|---|
| 4,462,676 A | * | 7/1984 | Shimura et al. | 399/165 |
| 5,394,222 A | * | 2/1995 | Genovese | 399/167 |
| 5,479,241 A | * | 12/1995 | Hou et al. | 399/75 |
| 6,062,453 A | * | 5/2000 | Murray et al. | 226/19 |
| 6,126,512 A | * | 10/2000 | Chao et al. | 451/9 |
| 6,237,752 B1 | * | 5/2001 | El-Ibiary | 198/810.03 |
| 6,286,663 B1 | * | 9/2001 | Hartmann | 198/810.03 |

* cited by examiner

*Primary Examiner*—Khoi H. Tran
(74) *Attorney, Agent, or Firm*—Pearne & Gordon LLP (57) ABSTRACT

An automatic centering device for a conveyor belt for industrial and/or agricultural machinery looped around at least two tensioning rollers characteristically comprises: a detection system which generates a signal correlated to a transversal movement of the belt in a direction relative to its reference position centered on the two rollers; actuator means which drive the rotation of at least one of the two rollers in a plane parallel to the main plane in which the belt lies; a control unit, with the input connected to the detection system and the output connected to the actuator means. The control unit continuously implements a procedure which involves at least, in succession, a step of acquiring and processing the signal, a step of comparing the signal processed with a predetermined threshold value, and, if the threshold value is exceeded, a step of activating the actuator means in which the two rollers are made to converge on the side opposite that of the transversal movement of the belt by a predetermined angle relative to their starting configuration for a predetermined time, to promote a transversal movement of the belt in the opposite direction and return it to its reference position.

58 Claims, 3 Drawing Sheets

AUTOMATIC CENTERING DEVICE FOR A CONVEYOR BELT FOR INDUSTRIAL AND/OR AGRICULTURAL MACHINERY

BACKGROUND OF THE INVENTION

The present invention relates to an automatic centering device for a conveyor belt for industrial and/or agricultural machinery, in particular for applications in which the material processed by the machine must be carried by the belt at high speed. In many industrial machines (such as mills or similar machines), and in agricultural machinery dedicated, for example, to harvesting, sifting or selecting agricultural products, the conveyor belts used are of the type which are looped around two cylindrical tensioning rollers substantially parallel to one another, one of which may transmit motion to the belt. The belt and the rollers are normally protected by a guard which surrounds the space enclosed by the belt at least as far as the edge of the belt. The conveyor belt normally has ribs transversal to the direction of motion, which allow or increase the efficiency of the transfer of material and can be used to stiffen the belt. Such ribs normally stop at a given distance from the edges of the belt, to allow the space enclosed by the belt to be effectively protected from dust and dirt by means of protective straps fixed to the guard and sliding on the belt.

Conveyor belts of this type are also and in particular used in mowing machines which are self-propelled, towed or drawn by means of transport such as tractors or others, in order to accumulate the mown material on one side or at the center of the mowing machine during movement of the latter.

Due to the particular conditions to which it is subject during operation, the conveyor belt often tends to move sideways towards one end or the other of the tensioning rollers, and is no longer centered. The causes of this behavior by the belt may lie in the high speed of the belt or the vibrations to which the belt is subject during machine operation, in particular caused by the machine transmission mechanisms, or by movement over rough ground in the case of a machine which is self-propelled, towed or drawn by another means. Another cause may be the infiltration of impurities between the roller and the belt, which may promote the transversal sliding of the belt during operation. Moreover, when the machine is moving over the ground, the belt easily loses its centering due to gravity, when the machine moves over sloping ground.

The sideways movement of the belt during operation produces many disadvantages. The loss of optimum positioning may lead to machine operating faults or increased pollution (from dust or other substances) of the space enclosed by the belt. Moreover, it can cause the edges of the belt to rub against parts of the guards, with a consequent rapid deterioration in the conveyor belt due to the high operating speed (in many cases, for example in the case of agricultural mowing machines, the belt speed may reach values of around 400 meters per minute).

In an attempt to avoid these problems, the operator would have to make frequent stops to manually center the belt again.

There are known conveyor belts for agricultural mowing machines which operate at high speed, in which the transversal ribs are extended as far as the edges of the belt. On both sides of the belt there are guides which, at the center of the upper (or lower) course of the belt extend from the guard towards the edge of the belt to make contact with the ends of the ribs if the belt moves transversally.

This type of solution allows a substantially guided belt movement, reducing its transversal movements. However, it does not solve the problem of belt wear due to rubbing on the guides although, to reduce the problem, the ribs used are made of a material which is stiffer than that used to make the belt. Moreover, this solution does not allow effective protection of the space enclosed by the belt from dust and dirt, since the ribs, extending as far as the edge of the conveyor belt, keep any protective straps present raised above the edge.

The aim of the present invention is to overcome the above-mentioned disadvantages by providing an automatic centering device for a conveyor belt for industrial and/or agricultural machinery, which allows the automatic detection of any movement by the conveyor belt from its optimum position and real time implementation of belt position correction without the need for operator intervention.

Another aim of the present invention is to provide an industrial and/or agricultural machine equipped with the automatic centering device for a conveyor belt which, amongst other things, comprises an efficient system for preventing dirt and impurities from entering the space inside the conveyor belt.

A further aim of the present invention is to provide an industrial and/or agricultural machine which comprises an efficient system for preventing dirt and impurities from entering the space inside the conveyor belt.

SUMMARY OF THE INVENTION

Accordingly these aims and others, which become clearer in the description which follows, are fulfilled, according to the invention, by an automatic centering device for a conveyor belt for industrial and/or agricultural machinery and by an industrial and/or agricultural machine as described in the claims herein.

BRIEF DESCRIPTION OF THE DRAWINGS

The invention is described in further detail with reference to the accompanying drawings, which illustrate a preferred embodiment of the invention, without limiting the scope of application, and in which.

DESCRIPTION OF THE PREFERRED EMBODIMENTS

With reference to the accompanying drawings, an automatic centering device for a conveyor belt 1 for industrial and/or agricultural machinery, the belt 1 being of the type looped around at least two tensioning rollers 21, 22, characteristically comprises: a detection system 3, generating a signal correlated to a transversal movement ST of the belt 1 in a direction relative to its reference position centered on the two rollers 21, 22; actuator means which drive the rotation of at least one (for example the roller 21) of the two rollers 21, 22 in a plane parallel to the main plane in which the belt 1 lies between the two rollers 21, 22; a control unit 4, its input connected to the detection system 3 and its output connected to the actuator means. The control unit 4 characteristically continuously implements a procedure including at least, in succession, a step of acquiring and processing the signal, a step of comparing the signal processed with a predetermined threshold value, and, if the threshold value is exceeded, a step of activating the actuator means in which the two rollers 21, 22 are made to converge on the side opposite the direction of transversal movement ST of the belt 1 by a predetermined angle α relative to their starting configuration, promoting a transversal movement of the belt 1 in the opposite direction and returning it towards its reference position.

The two tensioning rollers 21, 22 are normally cylindrical. They are also usually substantially parallel to one another, but may sometimes be angled towards one another by a given angle due to irregularities or the particular shape of the belt 1 used. Therefore, the belt 1 is in its reference position centered on the two rollers 21, 22 when the latter are converging on one side or the other. The angular correction implemented by the actuator means, therefore, makes the two rollers 21, 22 converge more on the side opposite that of the direction of the transversal movement ST: if they were diverging there, they converge or diverge less; if they were converging there, they converge more. Moreover, the starting configuration of the two rollers 21, 22 can also normally be that produced by a previous level of correction of the belt 1 positioning. Following an actuation step, the system normally remains in the same position until the control unit 4 indicates that a new conveyor belt 1 positioning correction is required.

Following the activation step, the control unit 4 continues the procedure and again checks the signal arriving from the detection system 3 and, if no further correction is needed (that is to say, if the signal value is below the predetermined threshold value), the rollers 21, 22 are kept in the same position. If a further correction is required (that is to say, the value of the signal processed is still higher than the threshold value), a new correction is applied to the positioning of the rollers 21, 22 and so on.

In the most simple applications, the conveyor belt 1 follows a straight path and is held taut only by two tensioning rollers 21, 22. However, in more complex applications, the conveyor belt 1 may follow a complex path, for example a polyline, with at least one tensioning roller (or a pair of rollers opposite one another on the two faces of the belt 1) placed at the endpoint of each segment. In this case, the device of the invention may be applied to each straight section of the conveyor belt 1 which is looped around the corresponding pair of tensioning rollers 21, 22 (and on any rollers opposite these, on the other face of the belt 1, if present).

The predetermined threshold value of the processed signal may be preset according to suitability (for example, small oscillations in position caused by minimal or physiological machine vibrations may not require correction, etc.).

The value of the angle of inclination of the rollers 21, 22 which determines the correction, that is to say, the predetermined angle of rotation α, may be modified or adjusted according to the input signal value, for example using algorithms of the PID (proportional—integral—derivative) type, which must be suitably calibrated relative to the type of use and operating conditions of the machine on which the belt 1 is installed.

Alternatively, the predetermined angle α is preferably independent of the value of the signal processed. In this case the correction occurs in steps which should preferabily be small enough, to prevent continuous conveyor belt 1 positioning correction, or belt 1 instability. The predetermined value of the angle α may, obviously, be modified or preset by the end user, by the machine manufacturer or the service technician, according to the characteristics of the conveyor belt 1 or the type of use.

In a first embodiment (not directly illustrated in detail in the accompanying drawings), the detection system 3 comprises at least one feeler, held in contact with part of the belt by elastic contact means and connected to a potentiometer for evaluation of the transversal movement of the belt 1.

The feeler could make contact with one edge of the belt 1, or it could make contact with one of the guides sometimes made on the internal face of the belt 1 or in another suitable position. Advantageously, there may be at least two feelers positioned on either side of the belt 1 to detect movements in opposite directions. Alternatively, a single feeler may be used with the belt reference position corresponding to an average value of the tension generated by the potentiometer in its travel from a minimum to a maximum tension value.

Appropriately, the feeler can be fitted with rolling friction means for contact with the belt 1 to prevent deterioration of both the belt 1 and the feeler.

In a second embodiment, the detection system 3 comprises at least one energizer element 5 integral with the belt 1 and detecting means 6 which detect the position of the energizer element 5 in a direction transversal to the movement of the belt 1. The detecting means 6 which detect the position of the energizer element 5 are normally fixed relative to the belt 1 supporting frame. However, the configuration may also be specular, with the energizer element 5 fixed relative to the belt 1 supporting frame and the detecting means 6 which detect its position located on the belt 1. However, the latter embodiment may have problems in the supply of electrical power to the detecting means 6, which are located on a part of the system which moves rapidly (the conveyor belt 1).

The energizer element 5 may comprise a projection, whose size and shape is such that as it passes it energizes electromechanical sensors evenly distributed along a line transversal to the movement of the belt 1. In this case, the electromechanical sensors are part of the dtecting means 6 which detect the position of the energizer element 5.

In this case, the procedure implemented by the control unit 4 includes recognition of the electromechanical sensor energized in each case, to determine the transversal movement ST of the belt 1 relative to the reference position.

Figure 7:
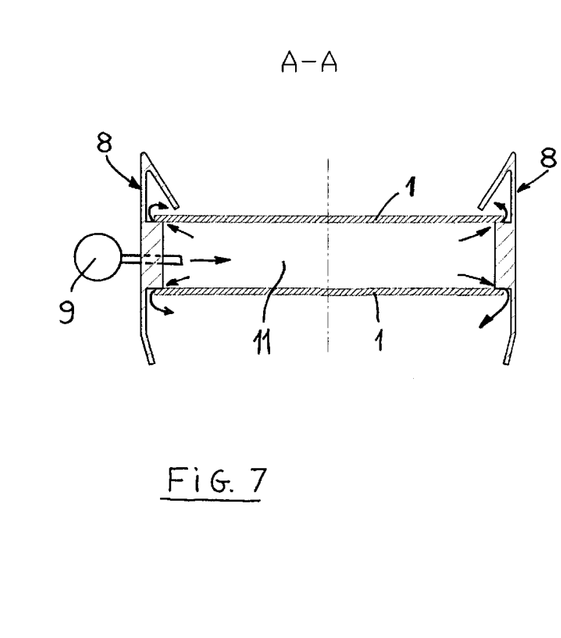
FIG. 7 is a schematic plan view and cross-section, with some parts cut away to better illustrate others, of a unit comprising a conveyor belt and rollers, equipped with a guard and a device for preventing pollution of the space inside the belt.

Alternatively, the energizer element 5 may comprise a source of a beam of electromagnetic radiation which, as it passes, energizes at least one of an array of corresponding sensors evenly distributed along a line transversal to the movement of the belt 1. In this case, the sensors are part of the detecting means 6 which detect the position of the energizer element 5. The electromagnetic radiation may consist of visible or infrared light radiation (and, in this case, the array of sensors may consist of an array of CCDs or similar sensors), but may also consist of radio waves or waves in other frequency ranges. The solution which uses light radiation can advantageously be used when there is no dust or impurities in the space inside the belt 1, where the detection system 3 normally operates. In the case of the present invention, this is possible both because the automatic centering correction makes extension of the ribs to the edges of the belt useless (and, therefore, allows any straps protecting the space inside the belt 1 from dust to adhere well to the belt 1), and because, in a preferred embodiment of the invention, the industrial and/or agricultural machine to which the device is applied is equipped with a system for keeping said space clean. In particular, as illustrated in FIG. 7, irrespective of the type of automatic centering device, the machine (both agricultural and industrial) comprises a guard 8 which encloses the space 11 inside the belt 1 and a pump 9 which blows a compressed gaseous substance into the space 11 inside the belt 1, to keep the pressure in the space 11 inside the belt 1 higher than outside and prevent the entry of impurities and dirt from outside. The cross-section in FIG. 7 schematically illustrates the movements of the compressed gaseous substance, which forms a barrier to the entry of impurities. This embodiment is very advantageous in general, not only on machines equipped with the automatic centering device of the invention, but also on normal machines with conveyor belts 1, whose internal space 11 must be protected against the entry of impurities.

In a preferred embodiment of the invention, illustrated in FIGS. 1 to 6, the detection system 3 comprises at least two magnetic sensors 61, 62, fixed relative to the belt 1 supporting frame and facing the belt 1, as well as at least one magnetic flux changer element 51, integral with the belt 1, which, when the belt 1 is in its reference position centered on the two rollers 21, 22, is centered in a middle plane 63 between the two magnetic sensors 61, 62 which is substantially perpendicular to the main plane in which the belt 1 lies and parallel to the direction of belt 1 movement. The size of the magnetic flux changer element 51 longitudinally to the belt 1 is such that the passage of at least one part of it near one of the two magnetic sensors 61, 62 causes a variation in the magnetic flux which makes the magnetic sensor 61, 62 involved in the passage produce a detectable electrical pulse.

The signal correlated to the transversal movement ST of the belt 1 in a direction relative to the reference position is defined by a series of successive pulses all arriving from only one of the two magnetic sensors 61, 62.

The signal correlated to the transversal movement ST of the belt 1 in the opposite direction relative to the reference position is defined by a series of successive pulses all arriving from only the other of the two magnetic sensors 61, 62.

The predetermined threshold value of the signal consists of a predetermined number of successive pulses, all arriving only from the same sensor.

This threshold, or maximum number of consecutive pulses, may be chosen according to the speed at which the conveyor belt 1 moves and according to its overall length, to avoid corrections which are unnecessary and too frequent, or the possibility that, before implementation of the correction required, there is a transversal movement ST of the belt 1 which is too large. It is normally advantageous to apply the correction by imparting a rotation corresponding to a value of the predetermined angle α independent of the value of the signal processed.

The step of acquiring and processing the signal involves recognition of the magnetic sensor 61, 62 from which the pulse arrives and, if the previous pulse arrived from the same magnetic sensor 61, 62 and the other magnetic sensor 61, 62 did not simultaneously generate a pulse, increasing the pulse count or, otherwise, zeroing the count and reinitializing it.

Here, the expression "otherwise" means that, in order to zero the count, only one of the following two conditions needs to be satisfied: either both of the sensors 61, 62 emit a pulse simultaneously, or the single previous pulse arrived from the other magnetic sensor 61, 62.

The step of comparing the signal processed with the predetermined threshold value is performed after acquisition and processing of each pulse.

The step of activating the actuator means is implemented when the control unit 4 detects that a series of successive pulses has been produced, all arriving from a single magnetic sensor 61, 62 whose count exceeds the predetermined threshold value, the direction of movement corresponding to said single magnetic sensor 61, 62. At the end of the activating step, the procedure involves pulse count zeroing and reinitializing.

When the belt 1 remains in the reference position, the magnetic flux changer element 51 is centered in the middle plane 63 and, therefore, each time the belt 1 turns, only one of the following two situations is possible:

no pulse is produced if, transversally to the belt 1, the size of the magnetic flux changer element 51 is less than or at most equal to the minimum distance between the magnetic sensors 61, 62 measured perpendicularly to the middle plane 63;

a pulse is produced by both magnetic sensors 61, 62 if the minimum distance between the magnetic sensors 61, 62 measured perpendicularly to the middle plane 63 is less than the size of the magnetic flux changer element 51 transversally to the belt 1.

In the latter case, the two pulses produced by the two magnetic sensors 61, 62 may be simultaneous when the sensors are aligned on a line perpendicular to the middle plane 63, or in rapid succession one after another when this condition does not arise. When the magnetic flux changer element 51 moves stably on one side of the middle plane 63 following a transversal movement ST of the belt 1 in that direction, there is a succession of consecutive pulses arriving from only one of the magnetic sensors 61, 62. When the magnetic flux changer element 51 oscillates about the middle plane 63 following an oscillation of the belt 1 about the reference position, there is a series of successions of consecutive pulses arriving alternatively from both magnetic sensors 61, 62. Therefore, in the preferred embodiment of the present invention, the procedure implemented by the control unit 4 guarantees checking and correction of the conveyor belt 1 position, as well as identification of the precise direction in which rotation of the rollers 21, 22 is required by identifying the single magnetic sensor 61, 62 which exceeded the threshold value for the processed signal.

In an embodiment not illustrated in the accompanying drawings, the minimum distance between the magnetic sensors 61, 62 measured perpendicularly to the middle plane 63 may be less than the size of the magnetic flux changer element 51 transversally to the belt 1. In this case, when the belt is substantially centered, the magnetic sensors 61, 62, if aligned on the line perpendicular to the middle plane 63, simultaneously emit pulses and the control unit must provide an algorithm which recognizes that they coincide, allowing the pulse count to be zeroed if necessary. If the two magnetic sensors 61, 62 are not aligned, so that the magnetic flux changer element 51 only encounters them one after another, said algorithm may not be required. The minimum distance between the magnetic sensors 61, 62 measured perpendicularly to the middle plane 63 may be less than the size of the magnetic flux changer element 51 transversally to the belt 1, defining a predetermined maximum tolerance for the transversal movement of the belt 1 (within which no countable pulses are marked).

In the embodiment illustrated in the figures, the size of the magnetic flux changer element 51 transversally to the belt 1 is preferably less than or at most equal to the minimum distance between the magnetic sensors 61, 62 measured perpendicularly to the middle plane 63. In particular, advantageously, the size of the magnetic flux changer element 51 transversally to the belt 1 is less than the minimum distance between the magnetic sensors 61, 62 measured perpendicularly to the middle plane 63 and such that it defines a predetermined maximum tolerance for the transversal movement of the belt 1 without causing the generation of pulses by either of the two magnetic sensors 61, 62.

In this case, since the pulses are always successive, the control unit 4 does not have to check if they coincide.

Figure 1:
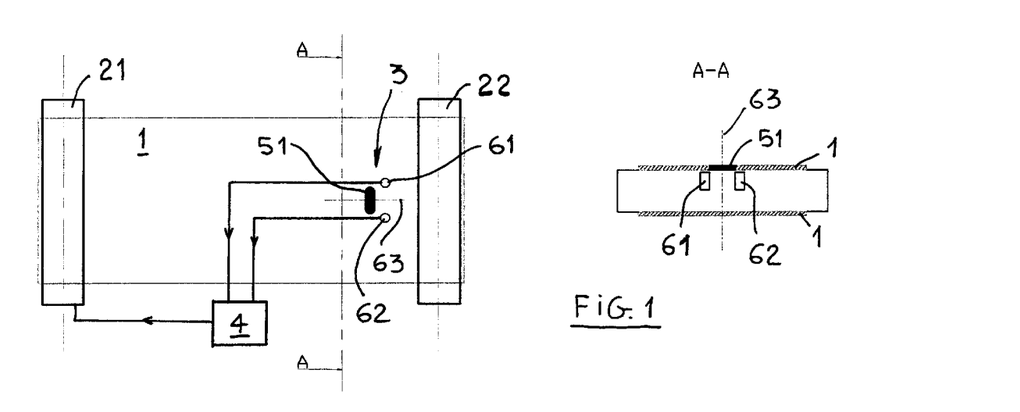
FIG. 1 is a schematic plan view and cross-section, with some parts cut away to better illustrate others, of a unit comprising a conveyor belt and tensioning rollers equipped with the centering device made in accordance with the present invention.
Figure 2:
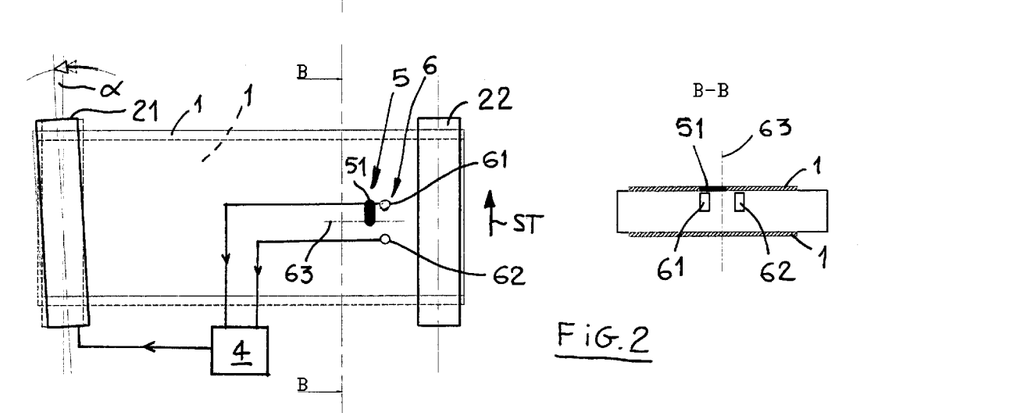
FIGS. 2 and 3 illustrate the unit in FIG. 1, highlighting the movements of the tensioning rollers actuated by the device to correct a transversal movement by the belt from the reference position.
Figure 3:
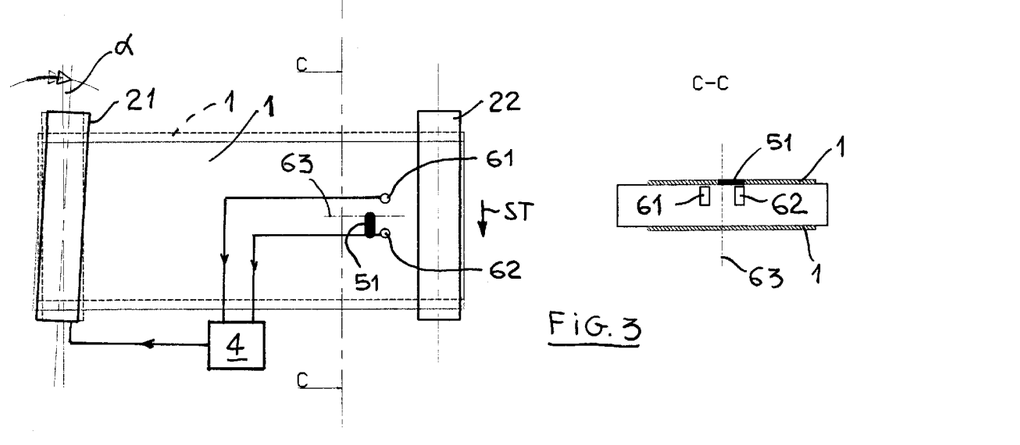
Figure 4:
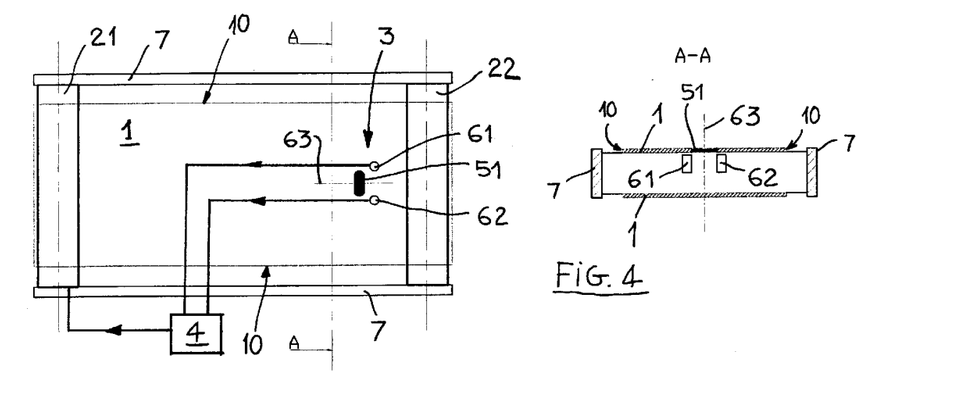
FIGS. 4, 5, 6 are schematic plan views and cross-sections, with some parts cut away to better illustrate others, of a unit similar to that illustrated in FIGS. 1, 2, 3, in which there are side guides to physically limit the transversal movement of the belt.
Figure 5:
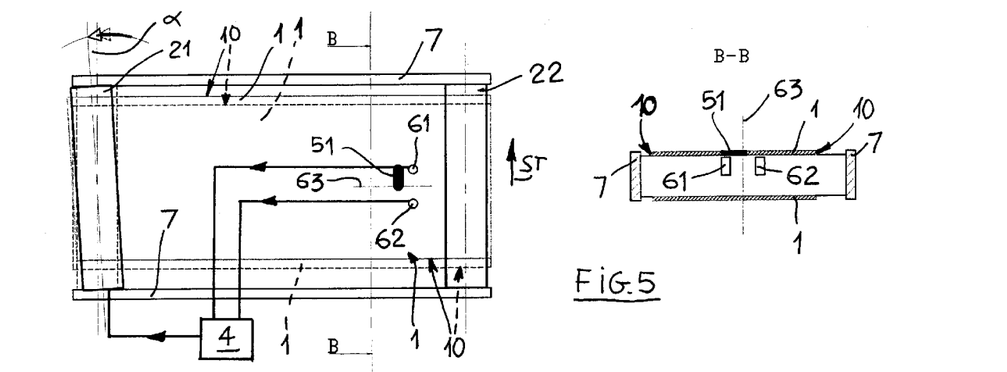
Figure 6:
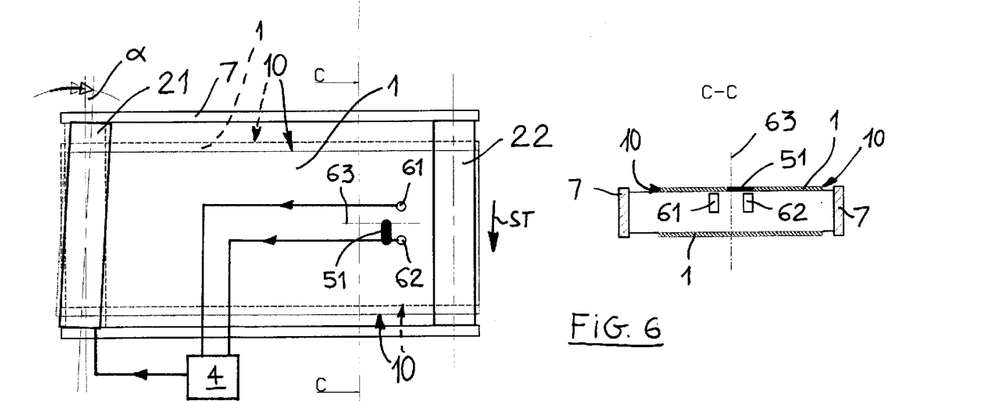

Advantageously, as illustrated in FIGS. 4 to 6, the size of the magnetic flux changer element 51 transversally to the belt 1 is greater than the distance, when the belt 1 is in the reference position, separating each edge 10 of the belt 1 and contact guides 7 located on either side of the belt 1 to physically limit the maximum transversal movement of the belt 1 itself.

The magnetic flux changer element 51 may be made in various ways, for example using a suitably shaped iron plate fixed to the belt 1 with a simple screw-nut coupling.

In the case of particularly long belts 1, it is possible to consider the suitable distribution along the belt 1 of a succession of pairs of magnetic sensors 61, 62, all operating with a single magnetic flux changer element 51. In this case, the control unit 4 could implement the activating step after suitably processing the signals arriving from all of the pairs of magnetic sensors 61, 62.

In the case already described, in which the actuating step is performed by making the roller 21 (or rollers 21, 22) rotate by a predetermined angle α whose value is independent of the value of the signal processed, the procedure implemented by the control unit 4 advantageously also includes evaluation of the time for which the transversal movement ST of the belt 1 from the reference position maintains the same direction, and, if a predetermined maximum time interval TMAX is exceeded, substitution of the predetermined value of the angle α with a higher value, for a more rapid recovery of the reference position.

Obviously, this operation is accompanied by implementation of an algorithm to check the permanence (if any) of the direction of the transversal movement ST.

The time for which the transversal movement ST of the belt 1 from the reference position maintains the same direction may be directly evaluated with a time counter, by means of a suitable sub-procedure. For example, said sub-procedure may, if necessary, avoid considering the transients linked to the belt 1 start-up, considering only the regime when the belt 1 operates at a substantially constant running speed.

The time can also be evaluated in a different way, for example by counting the pulses sent by the sensor or sensors, which indicate the transversal movement ST in a given direction or by checking if the signal constantly consists of pulses arriving from said sensors. This method is better suited to the preferred embodiment of the invention and is substantially unconnected to the various transients to which the belt 1 movement may be subject. On the whole, the time may be qualitatively evaluated by checking the permanence of the "sign" of the signal processed, therefore, indicating the constancy of the direction of the transversal movement ST.

In the case of the above-mentioned, preferred embodiment of the invention, which uses the magnetic sensors 61, 62, advantageously, at the end of the actuator means activating step, the procedure also includes an increase in the count of consecutive activating step if the previous activating step caused a rotation in the same direction or, otherwise, its zeroing followed by re-initialization of a new count corresponding to the other direction of rotation. The count of consecutive activating steps is compared each time with a predetermined maximum number of concordant activating steps which represents the predetermined maximum time interval.

Consecutive concordant activating steps which are far apart in terms of time and all correspond to complete corrections of the belt 1 positioning due to repetition of the same transversal movement ST of the belt 1 from the reference position, could erroneously be recognized as a correction which is not yet complete and, therefore, give rise to an inappropriate increase in the value of the predetermined angle α. To prevent this, the procedure implemented by the control unit 4 opportunely involves the acquisition of the time which elapses between two consecutive concordant activating steps and comparison of said time with a predetermined threshold value, above which the procedure zeroes and reinitializes the concordant consecutive activating step count.

Advantageously, the two magnetic sensors 61, 62 are positioned close to one of the two tensioning rollers 21, 22 so that they are less affected by belt 1 vibrations and oscillations perpendicular to the plane in which it lies.

The device of the invention may also be equipped with a display which shows at least the current activating step. The display may also show the user the direction of rotation of the roller 21 or rollers 21, 22, and other parameters useful for checking device operation.

The present invention also normally refers to an industrial or agricultural machine comprising a conveyor belt 1 of the type looped around at least two tensioning rollers 21, 22 and characteristically equipped with the automatic centering device for the belt 1 described above.

The invention has important advantages. Firstly, it avoids the need for manual centering or adjustment of the position of the conveyor belt relative to the ends of the tensioning rollers. Secondly, wear on the conveyor belt and guard, or any contact guides against which the conveyor belt may rub is reduced to negligible levels. Another important advantage, deriving from the low probability of the belt rubbing against parts of the frame or guard, is the possibility of creating transversal ribs on the belt which are made of the same material used to make the belt (and may form a single block with the belt) which do not extend as far as the edges of the belt, allowing more efficient protection of the space inside the belt from dust and impurities.

The present invention allows a drastic reduction in down time and, therefore, improved efficiency.

The invention described can be subject to numerous modifications and variations without thereby departing from the scope of the inventive concept. Moreover, all the details of the invention may be substituted by technically equivalent elements. Basically all materials used and dimensions may be of any type or value, according to requirements.

What is claimed:

1. An automatic centering device for a conveyor belt for industrial and/or agricultural machinery, the belt being of the type looped around at least two tensioning rollers, the device comprising:

a detection system which generates a signal correlated to a transversal movement of the belt in a direction relative to a belt's centered reference position, and wherein said belt is centered on the two rollers;

actuator means which drive the rotation of at least one of the two rollers in a plane parallel to the main plane in which the belt lies between the two rollers;

a control unit, its input connected to the detection system and its output connected to the actuator means, continuously implementing a procedure involving at least, in succession, a step of acquiring and processing the signal, a step of comparing the signal processed with a predetermined threshold value and, if the threshold value is exceeded, a step of activating the actuator means in which the two rollers are made to converge on the side opposite the direction of the transversal movement of the belt by a predetermined angle relative to their starting configuration, promoting a transversal movement of the belt in the opposite direction and returning it towards its reference position.

2. The device according to claim 1, wherein the predetermined angle is independent of the value of the signal processed.

3. The device according to claim 2, wherein the procedure also includes evaluation of the time for which the transversal movement of the belt from the reference position maintains the same direction, and, if a predetermined maximum time interval is exceeded, substitution of the predetermined angle with a higher value, allowing more rapid recovery of the reference position.

4. The device according to claim 1 or 3, wherein the detection system comprises at least one feeler, the latter being held in contact with part of the belt by elastic contact means and connected to a potentiometer for evaluating the transversal movement of the belt.

5. The device according to claim 1, wherein the detection system comprises at least one energizer element integral with the belt and detecting means which detect the position of the energizer element transversal to the belt movement.

6. The device according to claim 3, wherein the detection system comprises at least one energizer element integral with the belt and detecting means which detect the position of the energizer element transversal to the belt movement.

7. The device according to claim 5 or 6, wherein the energizer element comprises a projection of a size and shape such that as it passes it energizes electromechanical sensors evenly distributed along a line transversal to the belt movement, the electromechanical sensors being part of the detecting means which detect the position of the energizer element.

8. The device according to claim 5 or 6, wherein the energizer element comprises a source of a beam of electromagnetic radiation such that its passage energizes at least one of an array of corresponding sensors evenly distributed along a line transversal to the movement of the belt, the sensors being part of the detecting means which detect the position of the energizer element.

9. The device according to claim 1, wherein:

the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor, whose count exceeds the predetermined threshold value, the direction of movement corresponding to said single magnetic sensor; and at the end of the activating step, the procedure involves pulse count zeroing and re-initializing.

10. The device according to claim 2, wherein:

the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor, whose count exceeds the predetermined threshold value, the direction of movement corresponding to said single magnetic sensor; and at the end of the activating step, the procedure involves pulse count zeroing and re-initializing.

11. The device according to claim 3, wherein:

the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor, whose count exceeds the predetermined threshold value, the direction of movement corresponding to said single magnetic sensor; and at the end of the activating step, the procedure involves pulse count zeroing and reinitializing.

12. The device according to claim 3, wherein:

the detection system comprises at least two magnetic sensors, fixed relative to the belt supporting frame and facing the belt, as well as at least one magnetic flux changer element, integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor whose count exceeds the predetermined threshold value, the direction of movement corresponding to said single magnetic sensor;

at the end of the activating step, the procedure involves pulse count zeroing and re-initializing; and at the end of the activating step the procedure further involves increasing a count of consecutive activating steps if the previous activating step caused a rotation in the same direction or, otherwise, its zeroing followed by initialization of a new count corresponding to the other direction of rotation, the count of consecutive activating steps being compared each time with a predetermined maximum number of concordant activating steps which represents the predetermined maximum time interval.

13. The device according to claim 12, wherein the procedure involves acquisition of the time which elapses between two consecutive concordant activating steps and comparison of said time with a predetermined threshold value, above which the procedure zeroes and reinitializes the count of concordant consecutive activating steps.

14. The device according to claim 9 or 10 or 11 or 12 or 13, wherein the size of the magnetic flux changer element transversally to the belt is less than or at most equal to the minimum distance between the magnetic sensors measured perpendicularly to the middle plane.

15. The device according to claim 9 or 10 or 11 or 12 or 13, wherein the size of the magnetic flux changer element transversally to the belt is less than the minimum distance between the magnetic sensors measured perpendicularly to the middle plane and such that it defines a predetermined maximum tolerance for transversal movement of the belt without causing the generation of pulses by either of the two magnetic sensors.

16. The device according to claim 9, wherein the minimum distance between the magnetic sensors measured perpendicularly to the middle plane is less than the size of the magnetic flux changer element transversally to the belt.

17. The device according to claim 10, wherein the minimum distance between the magnetic sensors measured perpendicularly to the middle plane is less than the size of the magnetic flux changer element transversally to the belt.

18. The device according to claim 11, wherein the minimum distance between the magnetic sensors measured perpendicularly to the middle plane is less than the size of the magnetic flux changer element transversally to the belt.

19. The device according to claim 12, wherein the minimum distance between the magnetic sensors measured perpendicularly to the middle plane is less than the size of the magnetic flux changer element transversally to the belt.

20. The device according to claim 13, wherein the minimum distance between the magnetic sensors measured perpendicularly to the middle plane is less than the size of the magnetic flux changer element transversally to the belt.

21. The device according to claim 16 or 17 or 18 or 19 or 20, wherein the minimum distance between the magnetic sensors measured perpendicularly to the middle plane is such that it defines a predetermined maximum tolerance for the transversal movement of the belt.

22. The device according to claim 9 or 10 or 11 or 12 or 13, wherein the size of the magnetic flux changer element transversally to the belt is greater than the distance, when the belt is in the reference position, separating each edge of the belt and contact guides located on either side of the belt to physically limit the maximum transversal movement of the belt itself.

23. The device according to claim 9 or 10 or 11 or 12 or 13, wherein the two magnetic sensors are positioned close to one of the two tensioning rollers.

24. The device according to claim 1, further comprising a display for showing at least the current activating step.

25. An industrial machine equipped with a conveyor belt of the type looped around at least two tensioning rollers, the industrial machine comprising an automatic belt centering device according to claim 1.

26. An agricultural machine equipped with a conveyor belt of the type looped around at least two tensioning rollers, the agricultural machine comprising an automatic belt centering device according to claim 1.

27. The industrial machine according to claim 25, and further comprising a guard enclosing the space inside the belt and a pump blowing a compressed gaseous substance into the space inside the belt, keeping the pressure in the space inside the belt higher than outside and preventing the entry of impurities and dirt from outside.

28. The agricultural machine according to claim 26, and further comprising a guard enclosing the space inside the belt and a pump blowing a compressed gaseous substance into the space inside the belt, keeping the pressure in the space inside the belt higher than outside and preventing the entry of impurities and dirt from outside.

29. An industrial machine equipped with a conveyor belt of the type looped around at least two tensioning rollers, the industrial machine comprising a guard enclosing the space inside the belt and a pump blowing a compressed gaseous substance into the space inside the belt, keeping the pressure in the space inside the belt higher than outside and preventing the entry of impurities and dirt from outside.

30. An agricultural machine equipped with a conveyor belt of the type looped around at least two tensioning rollers, the agricultural machine comprising a guard enclosing the space inside the belt and a pump blowing a compressed gaseous substance into the space inside the belt, keeping the pressure in the space inside the belt higher than outside and preventing the entry of impurities and dirt from outside.

31. The industrial machine according to claim 25, wherein the predetermined angle is independent of the value of the signal processed.

32. The industrial machine according to claim 31, wherein the procedure also includes evaluation of the time for which the transversal movement of the belt from the reference position maintains the same direction, and, if a predetermined maximum time interval is exceeded, substitution of the predetermined angle with a higher value, allowing more rapid recovery of the reference position.

33. The industrial machine according to claim 25, wherein:
   the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;
   the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;
   the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;
   the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;
   the step of comparing the signal processed with the predetermined threshold value is performed after acquisition and processing of each pulse;
   the step of activating the actuator means is implemented when the control unit detects that a series of successive pulses has been produced, all arriving from a single magnetic sensor, whose count exceeds the predetermined threshold value, the direction of movement corresponding to said single magnetic sensor; and
   at the end of the activating step, the procedure involves pulse count zeroing and re-initializing.

34. The industrial machine according to claim 31, wherein:
   the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor, whose count exceeds the predetermined threshold value, the direction of movement corresponding to said single magnetic sensor; and at the end of the activating step, the procedure involves pulse count zeroing and re-initializing.

35. The industrial machine according to claim 32, wherein:

the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor, whose count exceeds the predetermined threshold value, the direction of movement corresponding to said single magnetic sensor; and at the end of the activating step, the procedure involves pulse count zeroing and re-initializing.

36. The industrial machine according to claim 32, wherein:

the detection system comprises at least two magnetic sensors, fixed relative to the belt supporting frame and facing the belt, as well as at least one magnetic flux changer element, integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor whose count exceeds the predetermined threshold value, the direction of movement corresponding to said single magnetic sensor;

at the end of the activating step, the procedure involves pulse count zeroing and re-initializing; and at the end of the activating step the procedure further involves increasing a count of consecutive activating steps if the previous activating step caused a rotation in the same direction or, otherwise, its zeroing followed by initialization of a new count corresponding to the other direction of rotation, the count of consecutive activating steps being compared each time with a predetermined maximum number of concordant activating steps which represents the predetermined maximum time interval.

37. The industrial machine according to claim 36, wherein the procedure involves acquisition of the time which elapses between two consecutive concordant activating steps and comparison of said time with a predetermined threshold value, above which the procedure zeroes and reinitializes the count of concordant consecutive activating steps.

38. The agricultural machine according to claim 26, wherein the predetermined angle is independent of the value of the signal processed.

39. The agricultural machine according to claim 38, wherein the procedure also includes evaluation of the time for which the transversal movement of the belt from the reference position maintains the same direction, and, if a predetermined maximum time interval is exceeded, substitution of the predetermined angle with a higher value, allowing more rapid recovery of the reference position.

40. The agricultural machine according to claim 26, wherein:

the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor, whose count exceeds the predetermined threshold value, the direction of movement corresponding to said single magnetic sensor; and at the end of the activating step, the procedure involves pulse count zeroing and re-initializing.

41. The agricultural machine according to claim 38, wherein:

the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor, whose count exceeds the predetermined threshold value, the direction of movement corresponding to said single magnetic sensor; and at the end of the activating step, the procedure involves pulse count zeroing and re-initializing.

42. The agricultural machine according to claim 39, wherein:

the detection system comprises at least two magnetic sensors, fixed relative to the belt supporting frame and facing the belt, as well as at least one magnetic flux changer element integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor, whose count exceeds the predetermined threshold value, the direction of movement corresponding to said single magnetic sensor; and at the end of the activating step, the procedure involves pulse count zeroing and re-initializing.

43. The agricultural machine according to claim 39, wherein:

the detection system comprises at least two magnetic sensors, fixed relative to the belt supporting frame and facing the belt, as well as at least one magnetic flux changer element, integral with the belt which, when the belt is in its reference position centered on the two rollers, is centered in a middle plane between the two magnetic sensors which is substantially perpendicular to the main plane in which the belt lies and parallel to the direction of belt movement;

the size of the magnetic flux changer element longitudinally to the belt is such that the passage of at least one part of it near one of the two magnetic sensors causes a variation in the magnetic flux which makes the magnetic sensor involved in the passage produce a detectable electrical pulse;

the signal correlated to the transversal movement of the belt in a direction relative to the reference position is defined by a series of successive pulses all arriving from only one of the two magnetic sensors, the signal correlated to the transversal movement of the belt in the opposite direction relative to the reference position being defined by a series of successive pulses all arriving from only the other of the two magnetic sensors, and the predetermined threshold value of the signal consisting of a predetermined number of successive pulses, all arriving only from the same sensor;

the step of acquiring and processing the signal involves recognition of the magnetic sensor from which a pulse arrives and, if the previous pulse arrived from the same magnetic sensor and the other magnetic sensor did not simultaneously generate a pulse, increasing the pulse count or, otherwise, zeroing the count and reinitializing it;

the step of comparing the signal processed with the predetermined threshold value is performed after acquisition and processing of each pulse;

the step of activating the actuator means is implemented when the control unit detects that a series of successive pulses has been produced, all arriving from a single magnetic sensor whose count exceeds the predetermined threshold value, the direction of movement corresponding to said single magnetic sensor;

at the end of the activating step, the procedure involves pulse count zeroing and re-initializing; and at the end of the activating step the procedure further involves increasing a count of consecutive activating steps if the previous activating step caused a rotation in the same direction or, otherwise, its zeroing followed by initialization of a new count corresponding to the other direction of rotation, the count of consecutive activating steps being compared each time with a predetermined maximum number of concordant activating steps which represents the predetermined maximum time interval.

44. The agricultural machine according to claim 43, wherein the procedure involves acquisition of the time which elapses between two consecutive concordant activating steps and comparison of said time with a predetermined threshold value, above which the procedure zeroes and reinitializes the count of concordant consecutive activating steps.

45. The industrial machine according to claim 31, and further comprising a guard enclosing the space inside the belt and a pump blowing a compressed gaseous substance into the space inside the belt, keeping the pressure in the space inside the belt higher than outside and preventing the entry of impurities and dirt from outside.

46. The industrial machine according to claim 32, and further comprising a guard enclosing the space inside the belt and a pump blowing a compressed gaseous substance into the space inside the belt, keeping the pressure in the space inside the belt higher than outside and preventing the entry of impurities and dirt from outside.

47. The industrial machine according to claim 33, and further comprising a guard enclosing the space inside the belt and a pump blowing a compressed gaseous substance into the space inside the belt, keeping the pressure in the space inside the belt higher than outside and preventing the entry of impurities and dirt from outside.

48. The industrial machine according to claim 34, and further comprising a guard enclosing the space inside the belt and a pump blowing a compressed gaseous substance into the space inside the belt, keeping the pressure in the space inside the belt higher than outside and preventing the entry of impurities and dirt from outside.

49. The industrial machine according to claim 35, and further comprising a guard enclosing the space inside the belt and a pump blowing a compressed gaseous substance into the space inside the belt, keeping the pressure in the space inside the belt higher than outside and preventing the entry of impurities and dirt from outside.

50. The industrial machine according to claim 36, and further comprising a guard enclosing the space inside the belt and a pump blowing a compressed gaseous substance into the space inside the belt, keeping the pressure in the space inside the belt higher than outside and preventing the entry of impurities and dirt from outside.

51. The industrial machine according to claim 37, and further comprising a guard enclosing the space inside the belt and a pump blowing a compressed gaseous substance into the space inside the belt, keeping the pressure in the space inside the belt higher than outside and preventing the entry of impurities and dirt from outside.

52. The agricultural machine according to claim 38, and further comprising a guard enclosing the space inside the belt and a pump blowing a compressed gaseous substance into the space inside the belt, keeping the pressure in the space inside the belt higher than outside and preventing the entry of impurities and dirt from outside.

53. The agricultural machine according to claim 39, and further comprising a guard enclosing the space inside the belt and a pump blowing a compressed gaseous substance into the space inside the belt, keeping the pressure in the space inside the belt higher than outside and preventing the entry of impurities and dirt from outside.

54. The agricultural machine according to claim 40, and further comprising a guard enclosing the space inside the belt and a pump blowing a compressed gaseous substance into the space inside the belt, keeping the pressure in the space inside the belt higher than outside and preventing the entry of impurities and dirt from outside.

55. The agricultural machine according to claim 41, and further comprising a guard enclosing the space inside the belt and a pump blowing a compressed gaseous substance into the space inside the belt, keeping the pressure in the space inside the belt higher than outside and preventing the entry of impurities and dirt from outside.

56. The agricultural machine according to claim 42, and further comprising a guard enclosing the space inside the belt and a pump blowing a compressed gaseous substance into the space inside the belt, keeping the pressure in the space inside the belt higher than outside and preventing the entry of impurities and dirt from outside.

57. The agricultural machine according to claim 43, and further comprising a guard enclosing the space inside the belt and a pump blowing a compressed gaseous substance into the space inside the belt, keeping the pressure in the space inside the belt higher than outside and preventing the entry of impurities and dirt from outside.

58. The agricultural machine according to claim 44, and further comprising a guard enclosing the space inside the belt and a pump blowing a compressed gaseous substance into the space inside the belt, keeping the pressure in the space inside the belt higher than outside and preventing the entry of impurities and dirt from outside.

* * * * *